(12) United States Patent
Ellis

(10) Patent No.: US 12,011,895 B2
(45) Date of Patent: Jun. 18, 2024

(54) FOOTWEAR SOLES AND OTHER STRUCTURES WITH INTERNAL SIPES CREATED BY 3D PRINTING

(71) Applicant: Frampton E. Ellis, Jasper, FL (US)

(72) Inventor: Frampton E. Ellis, Jasper, FL (US)

( * ) Notice: Subject to any disclaimer, the term of this patent is extended or adjusted under 35 U.S.C. 154(b) by 982 days.

(21) Appl. No.: 16/700,701

(22) Filed: Dec. 2, 2019

(65) Prior Publication Data

US 2020/0171767 A1 Jun. 4, 2020

Related U.S. Application Data

(60) Provisional application No. 62/917,259, filed on Dec. 1, 2018.

(51) Int. Cl.
| | |
|---|---|
| *B29D 35/12* | (2010.01) |
| *A43B 13/20* | (2006.01) |
| *B29C 64/10* | (2017.01) |
| *B29L 31/50* | (2006.01) |
| *B33Y 10/00* | (2015.01) |
| *B33Y 80/00* | (2015.01) |

(52) U.S. Cl.
CPC ............ *B29D 35/122* (2013.01); *B29C 64/10* (2017.08); *A43B 13/20* (2013.01); *B29L 2031/504* (2013.01); *B33Y 10/00* (2014.12); *B33Y 80/00* (2014.12)

(58) Field of Classification Search
None
See application file for complete search history.

(56) References Cited

U.S. PATENT DOCUMENTS

| | | | |
|---|---|---|---|
| 4,989,349 A | 2/1991 | Ellis, III |
| 5,317,819 A | 6/1994 | Ellis, III |
| 5,544,429 A | 8/1996 | Ellis, III |
| 5,909,948 A | 6/1999 | Ellis, III |
| 6,115,941 A | 9/2000 | Ellis, III |
| 6,115,945 A | 9/2000 | Ellis, III |
| 6,163,982 A | 12/2000 | Ellis, III |
| 6,295,744 B1 | 10/2001 | Ellis, III |
| 6,308,439 B1 | 10/2001 | Ellis, III |
| 6,314,662 B1 | 11/2001 | Ellis, III |
| 6,360,453 B1 | 3/2002 | Ellis, III |
| 6,487,795 B1 | 12/2002 | Ellis, III |
| 6,584,706 B1 | 7/2003 | Ellis, III |

(Continued)

FOREIGN PATENT DOCUMENTS

JP 2018075820 A 5/2018

*Primary Examiner* — Jeffrey M Wollschlager
*Assistant Examiner* — Guy F Mongelli
(74) *Attorney, Agent, or Firm* — Mendelsohn Dunleavy, P.C.

(57) ABSTRACT

A method of making a device by a three-dimensional (3D) printing process, the method comprising a step of excluding, during the 3D printing process, the printing in one or more defined areas of one or more layers of the device in order to form at least one internal sipe in said device, the sipe being defined by two opposing surfaces that are configured to contact one another and slide against each other when said device is in a loaded condition, as viewed in a single plane cross-section; or wherein during the 3D printing process the internal sipe is formed by the exclusion of one or more print particles (3D dots) in many layers of the device, as viewed in a single plane cross-section.

17 Claims, 9 Drawing Sheets

(56) References Cited

U.S. PATENT DOCUMENTS

| | | | | |
|---|---|---|---|---|
| 6,591,519 | B1 | 7/2003 | Ellis, III | |
| 6,609,312 | B1 | 8/2003 | Ellis, III | |
| 6,629,376 | B1 | 10/2003 | Ellis, III | |
| 6,662,470 | B2 | 12/2003 | Ellis, III | |
| 6,668,470 | B2 | 12/2003 | Ellis, III | |
| 6,675,498 | B1 | 1/2004 | Ellis, III | |
| 6,675,499 | B2 | 1/2004 | Ellis, III | |
| 6,708,424 | B1 | 3/2004 | Ellis, III | |
| 6,729,046 | B2 | 5/2004 | Ellis, III | |
| 6,748,674 | B2 | 6/2004 | Ellis, III | |
| 6,763,616 | B2 | 7/2004 | Ellis, III | |
| 6,789,331 | B1 | 9/2004 | Ellis, III | |
| 6,810,606 | B1 | 11/2004 | Ellis, III | |
| 6,877,254 | B2 | 4/2005 | Ellis, III | |
| 6,918,197 | B2 | 7/2005 | Ellis, III | |
| 7,010,869 | B1 * | 3/2006 | Ellis, III | A43B 7/1415 36/161 |
| 7,082,697 | B2 | 8/2006 | Ellis, III | |
| 7,093,379 | B2 | 8/2006 | Ellis, III | |
| 7,127,834 | B2 | 10/2006 | Ellis, III | |
| 7,168,185 | B2 | 1/2007 | Ellis, III | |
| 7,174,658 | B2 | 2/2007 | Ellis, III | |
| 7,234,249 | B2 | 6/2007 | Ellis, III | |
| 7,287,341 | B2 | 10/2007 | Ellis, III | |
| 7,334,350 | B2 | 2/2008 | Ellis, III | |
| 7,334,356 | B2 | 2/2008 | Ellis, III | |
| 7,546,699 | B2 | 6/2009 | Ellis, III | |
| 7,562,468 | B2 | 7/2009 | Ellis, III | |
| 7,647,710 | B2 | 1/2010 | Ellis, III | |
| 7,707,742 | B2 | 5/2010 | Ellis, III | |
| 7,793,429 | B2 | 9/2010 | Ellis, III | |
| 7,793,430 | B2 | 9/2010 | Ellis, III | |
| 8,141,276 | B2 | 3/2012 | Ellis | |
| 8,205,356 | B2 | 6/2012 | Ellis | |
| 8,256,147 | B2 | 9/2012 | Ellis | |
| 8,261,468 | B2 | 9/2012 | Ellis, III | |
| 8,291,614 | B2 | 10/2012 | Ellis | |
| 8,291,618 | B2 | 10/2012 | Ellis | |
| 8,494,324 | B2 | 7/2013 | Ellis | |
| 8,561,323 | B2 * | 10/2013 | Ellis | A42B 3/125 36/103 |
| 8,562,678 | B2 | 10/2013 | Ellis | |
| 8,567,095 | B2 | 10/2013 | Ellis | |
| 8,656,607 | B2 | 2/2014 | Ellis | |
| 8,667,709 | B2 | 3/2014 | Ellis | |
| 8,732,868 | B2 | 5/2014 | Ellis | |
| 8,819,961 | B1 | 9/2014 | Ellis | |
| 8,925,117 | B2 | 1/2015 | Ellis | |
| 8,959,804 | B2 | 2/2015 | Ellis | |
| 9,030,335 | B2 | 5/2015 | Ellis | |
| D731,766 | S | 6/2015 | Ellis | |
| 9,063,529 | B2 | 6/2015 | Ellis | |
| 9,100,495 | B2 | 8/2015 | Ellis | |
| 9,107,475 | B2 | 8/2015 | Ellis | |
| 9,113,675 | B2 | 8/2015 | DeHaven | |
| 9,160,836 | B2 | 10/2015 | Ellis | |
| 9,207,660 | B2 | 12/2015 | Ellis | |
| 9,339,074 | B2 | 5/2016 | Ellis | |
| 9,375,047 | B2 | 6/2016 | Ellis | |
| 9,504,291 | B2 | 11/2016 | Ellis | |
| 9,709,971 | B2 | 7/2017 | Ellis | |
| 9,877,523 | B2 | 1/2018 | Ellis | |
| 2003/0046830 | A1 * | 3/2003 | Ellis, III | A43B 13/20 36/28 |
| 2005/0076536 | A1 * | 4/2005 | Hatfield | A43B 23/04 36/3 R |
| 2008/0022556 | A1 * | 1/2008 | Ellis, III | A43B 13/187 36/28 |
| 2008/0083143 | A1 * | 4/2008 | Maybury | E02F 3/8891 37/317 |
| 2012/0186101 | A1 * | 7/2012 | Sanchez | A43B 11/00 36/43 |
| 2015/0052781 | A1 * | 2/2015 | Hatfield | A43B 5/00 36/25 R |
| 2015/0324490 | A1 * | 11/2015 | Page | G06Q 30/0621 700/98 |
| 2017/0042288 | A1 * | 2/2017 | Lawless | A43B 13/223 |

* cited by examiner

FOOTWEAR SOLES AND OTHER STRUCTURES WITH INTERNAL SIPES CREATED BY 3D PRINTING

FIELD OF THE INVENTION

The present invention relates to methods of making devices with internal sipes using three dimensional (3D) printing.

BACKGROUND OF THE INVENTION

The applicant's patents for footwear soles with internal sipes, which are U.S. Pat. No. 6,763,616 issued Jul. 20, 2004; U.S. Pat. No. 8,141,276 issued Mar. 27, 2012; U.S. Pat. No. 8,205,356 issued Jun. 26, 2012; U.S. Pat. No. 8,256,147 issued Sep. 4, 2012; U.S. Pat. No. 8,291,618 issued Oct. 23, 2012; U.S. Pat. No. 8,561,323 Oct. 22, 2013; U.S. Pat. No. 8,567,095 issued Oct. 29, 2013; U.S. Pat. No. 8,959,804 issued Feb. 24, 2015; U.S. Pat. No. 9,107,475 issued Aug. 18, 2015; and U.S. Pat. No. 9,339,074 issued May 17, 2016, are hereby incorporated by reference herein in their entirety into this application for completeness of disclosure.

The applicant's patents for footwear soles with external sipes, which are U.S. Pat. No. 6,115,945 issued Sep. 12, 2000 and U.S. Pat. No. 5,909,948 Jun. 8, 1999, are hereby incorporated by reference herein in their entirety into this application for completeness of disclosure.

The applicant's patents for electronic, electromechanical and other devices with internal sipes, which are U.S. Pat. No. 8,732,868 issued May 27, 2014: U.S. Pat. No. 8,562,678 issued Oct. 22, 2013; and U.S. Pat. No. 8,494,324 issued Jul. 23, 2013, are hereby incorporated by reference herein in their entirety into this application for completeness of disclosure.

The applicant's patents for other devices with internal sipes, which are U.S. Pat. No. 8,925,117; issued Jan. 6, 2015; and U.S. Pat. No. 8,819,961 issued Sep. 2, 2014, are hereby incorporated by reference herein in their entirety into this application for completeness of disclosure.

The applicant's patents for smartphone-controlled configuration of footwear soles and other devices (including those with internal sipes), which are U.S. Pat. No. 9,030,335 issued May 12, 2015; U.S. Pat. No. 9,063,529 issued Jun. 23, 2015; U.S. Pat. No. 9,100,495 Aug. 4, 2015; U.S. Pat. No. 9,160,836 issued Oct. 13, 2015; U.S. Pat. No. 9,207,660 issued Dec. 8, 2015; U.S. Pat. No. 9,375,047 Jun. 28, 2016; U.S. Pat. No. 9,504,291 issued Nov. 29, 2016; U.S. Pat. No. 9,709,971 issued Jul. 18, 2017; and U.S. Pat. No. 9,877,523 Jan. 30, 2018, are hereby incorporated by reference herein in their entirety into this application for completeness of disclosure.

The applicant's patents for computer controlled compartments and bladders for footwear and orthotics, which are U.S. Pat. No. 7,010,869 issued Mar. 14, 2006; U.S. Pat. No. 7,334,350 issued Feb. 26, 2008; U.S. Pat. No. 7,562,468 issued Jul. 21, 2009; U.S. Pat. No. 7,707,742 issued May 4, 2010; U.S. Pat. No. 7,793,429 issued Sep. 14, 2010; U.S. Pat. No. 7,793,430 issued Sep. 14, 2010; U.S. Pat. No. 8,261,468 issued Sep. 11, 2012; U.S. Pat. No. 8,291,614 issued Oct. 23, 2012; U.S. Pat. No. 8,656,607 issued Feb. 25, 2014; and U.S. Pat. No. 8,667,709 issued Mar. 11, 2014, are hereby incorporated by reference herein in their entirety into this application for completeness of disclosure.

The applicant's patents for footwear soles based on barefoot soles, which are U.S. Pat. No. 5,317,819 issued Jun. 7, 1994; U.S. Pat. No. 4,989,349 issued Feb. 5, 1991; U.S. Pat. No. 5,544,429 issued Aug. 13, 1996; U.S. Pat. No. 6,115,941 Sep. 12, 2000; U.S. Pat. No. 6,163,982 issued Dec. 26, 2000; U.S. Pat. No. 6,295,744 issued Oct. 2, 2001; U.S. Pat. No. 6,308,439 issued Oct. 30, 2001; U.S. Pat. No. 6,314,662 Nov. 13, 2001; U.S. Pat. No. 6,360,453 issued Mar. 26, 2002; U.S. Pat. No. 6,487,795 issued Dec. 3, 2002; U.S. Pat. No. 6,584,706 issued Jul. 1, 2003; U.S. Pat. No. 6,591,519 issued Jul. 15, 2003; U.S. Pat. No. 6,609,312 issued Aug. 26, 2003; U.S. Pat. No. 6,629,376 issued Oct. 7, 2003; U.S. Pat. No. 6,662,470 issued December 2003; U.S. Pat. No. 6,668,470 issued Dec. 30, 2003; U.S. Pat. No. 6,675,498 issued Jan. 13, 2004; U.S. Pat. No. 6,675,499 issued Jan. 13, 2004; U.S. Pat. No. 6,708,424 issued 23, 2004; U.S. Pat. No. 6,729,046 issued May 4, 2004; U.S. Pat. No. 6,748,674 issued Jun. 15, 2004; U.S. Pat. No. 6,789,331 issued Sep. 14, 2004; U.S. Pat. No. 6,810,606 issued Nov. 2, 2004; U.S. Pat. No. 6,877,254 issued Apr. 12, 2005; U.S. Pat. No. 6,918,197 issued Jul. 19, 2005; U.S. Pat. No. 7,082,697 issued Aug. 1, 2006; U.S. Pat. No. 7,093,379 issued Aug. 22, 2006; U.S. Pat. No. 7,127,834 Oct. 31, 2006; U.S. Pat. No. 7,168,185 issued Jan. 30, 2007; U.S. Pat. No. 7,174,658 issued Feb. 13, 2007; U.S. Pat. No. 7,234,249 issued Jun. 26, 2007; U.S. Pat. No. 7,287,341 issued Oct. 30, 2007; U.S. Pat. No. 7,334,356 issued Feb. 26, 2008; U.S. Pat. No. 7,546,699 issued Jun. 16, 2009; and U.S. Pat. No. 7,647,710 issued Jan. 19, 2010, are hereby incorporated by reference herein in their entirety into this application for completeness of disclosure.

SUMMARY OF THE INVENTION

This series of new inventions is for using the unique advantages of 3D printing to create any of the structures (or combination thereof) described in the applicant's above incorporated by reference U.S. patents, using new or similar or equivalent or the same materials (or any combination thereof).

In one embodiment, the invention relates to a method of making a device by a three-dimensional (3D) printing process, the method comprising a step of excluding, during the 3D printing process, printing in one or more defined areas of one or more layers of the device in order to form at least one internal sipe in said device, the at least one internal sipe being defined by two opposing surfaces that are configured to contact one another and slide against each other when said device is in a loaded condition, as viewed in a single plane cross-section.

In the foregoing embodiment, during the 3D printing process the at least one internal sipe may be formed by the exclusion of one or more print particles (3D dots) in many layers of the device, as viewed in a single plane cross-section.

In each of the foregoing embodiments, the device may be a sole for footwear or a portion of a sole for footwear. In the foregoing embodiment, the sole for footwear or the portion of a sole for footwear has a section with a structure having inner and outer surfaces that are curved, as viewed in frontal plane cross-sections when the sole for footwear or the portion of a sole for footwear is in an unloaded condition. In the foregoing embodiment, the sole for footwear or the portion of a sole for footwear may have a curved section with a structure having a uniform thickness as measured in frontal plane cross-sections when the sole for footwear or the portion of the sole for footwear is in an unloaded condition.

In each of the foregoing embodiments, the at least one internal sipe may be created by the exclusion during the 3D printing process of a portion of at least one or two or three or four or more layers of a material.

In each of the foregoing embodiments, the at least one internal sipe may be formed in a footwear sole or other device with configurable structures that can be controlled by or through a smartphone or other mobile digital computer.

In each of the foregoing embodiments, the method may form at least two internal sipes in the device, or at least four internal sipes, or at least six internal sipes.

In a second aspect, the invention relates to a method of making a device including at least first and second materials by a three-dimensional (3D) printing process, the method comprising steps of printing, during the 3D printing process, one or more defined areas of one or more layers of said device using said first material and printing another one or more-defined areas of one or more layers of said device using said second material which is different from said first material, in order to form at least one internal sipe in said device; said at least one internal sipe being defined by two opposing surfaces of the first material being separated by the at least second material and configured to slide relative to each other when said device is in a loaded condition, the at least second material being a lubricant or other media.

In the foregoing second aspect, during the 3D printing process the at least one internal sipe may be formed by the inclusion of one or more print particles (3D dots) of the at least second material in many layers of the at least first material of the device, as viewed in a single plane cross-section.

In each of the foregoing second aspects, the device may be a sole for footwear or a portion of a sole for footwear. In the foregoing second aspect, the sole for footwear or the portion of a sole for footwear may have a section with a structure having inner and outer surfaces that are curved, as viewed in a frontal plane cross-section when the sole for footwear or the portion of the sole for footwear is in an unloaded condition. In each of the foregoing second aspects, the sole for footwear or the portion of a sole for footwear may have a curved section with a structure having a uniform thickness as measured in frontal plane cross-sections when the sole for footwear or the portion of the sole for footwear is in an unloaded condition.

In each of the foregoing second aspects, the at least one internal sipe may be formed in a footwear sole or other device with configurable structures that can be controlled by or through a smartphone or other mobile digital computer.

In each of the foregoing second aspects, the method may form at least two internal sipes in the device, or at least four internal sipes, or at least six internal sipes.

In a third aspect, the present invention relates to a method of making a sole for footwear or a portion of a sole for footwear including at least first and second materials by a three-dimensional (3D) printing process, wherein during the 3D printing process at least one internal sipe is formed by the inclusion of one or more print particles (3D dots) of the at least second material in many layers of the at least first material in at least a curved section of the sole for footwear, as viewed in a frontal plane; the at least one internal sipe being defined by two opposing surfaces of the at least first material being separated by the at least second material and configured to slide relative to each other when said sole for footwear is in a loaded condition, the at least second material being a lubricant.

BRIEF DESCRIPTION OF THE DRAWINGS

FIGS. 1A-1D show a series of conventional shoe sole cross-sections in the frontal plane at the heel utilizing both sagittal plane and horizontal plane sipes, and in which some or all of the sipes do not originate from any outer shoe sole surface, but rather are entirely internal.

FIG. 1D shows a similar approach applied to the applicant's fully contoured design.

FIG. 1E shows a frontal or sagittal plane cross section view of an example of a device 510 such as a flexible insert with a siped compartment or chamber or bladder.

FIG. 1F show a top view in a horizontal plane of a device 510 example of FIG. 1E.

FIG. 1G is an exploded perspective view showing the relationship of an insert device 510, which has a siped compartment or chamber or bladder, with a midsole, bottom sole, and upper of a shoe or other footwear.

FIG. 2A show a frontal or sagittal plane cross section view of an example of a device 510 such as a flexible insert with a siped compartment or chamber or bladder.

FIG. 2B show a top view in a horizontal plane of a device 510 example of FIG. 2A.

FIG. 3 shows, in a frontal plane cross section in the heel area, a shoe and shoe sole including a single siped compartment 510.

FIG. 4 is a close-up view of an embodiment like FIG. 3 but showing magnetorheological fluid 508 located within an internal sipe 505.

FIG. 5A shows, in a frontal or sagittal plane cross section, a flexible insert or component 511 including a single compartment/chamber 161/188 or bladder with an associated internal sipe 505 component.

FIG. 5B shows a top horizontal plane view of flexible insert or component 511 of FIG. 5A.

FIG. 5C shows, in frontal or sagittal plane cross section, a flexible insert or component 513 forming a unitary internal sipe.

FIG. 5D is a top horizontal plane view of flexible insert or component 513 of FIG. 5C.

FIG. 6 shows a frontal plane cross section of an insert device 513 as a thin compartment or chamber or bladder forming an internal sipe such as a slit, the device being located in a footwear sole.

FIGS. 7A and 7B, show a heel section of a footwear sole or orthotic with an example of a flexible insert or component 510 using specific examples of the structural elements 502.

FIG. 8A shows, in sagittal plane cross sections, two examples of prior art human breast implants, the first inserted over pectoral muscle and the second inserted under pectoral muscle.

FIG. 8B shows an example of a human breast implant 540 with a siped compartment or chamber 510.

FIGS. 9A-9D show the much larger and more conventional attachment area between midsole and bottomsole for a shoe sole or orthotic with the 510/511/513 invention of FIGS. 9C-9D compared to prior shoe sole sipe inventions of FIGS. 9A-9B.

DETAILED DESCRIPTION OF THE PREFERRED EMBODIMENTS

For example, 3D printing can be used to produce the internal sipes indicated in all the above referenced footwear sole with internal sipes U.S. patents. This is especially useful for creating the embodiments disclosed in referenced U.S. Pat. No. 6,763,616, since doing so makes it a simple manufacturing process, rather than the highly complex, special technique manufacturing process that would otherwise be mandatory.

In addition, doing so makes optional from a manufacturing or construction viewpoint the additional structures associated or proximate to the internal sipes that are disclosed in the referenced U.S. Pat. No. 8,141,276 through U.S. Pat. No. 9,107,475 series and U.S. Pat. No. 9,030,335 through U.S. Pat. No. 9,877,523 series, although those additional structures may none the less provide other manufacturing, construction or performance improvements and also disclosed other embodiments not disclosed in the '616 patent.

The simple sipe structure of sipes 181 and 182 in the '616 footwear patent can be created using 3D printing to make any of the sipe structures 505 (with or without structures 500 & 501) shown in the '276 through '475 footwear patent series or the sipe structures 151 or 11 shown in the '945 or 948 footwear patents, or in any of the sipe structures 505 shown in any of the other above referenced U.S. patents, including the '276 through '475 patent series and '335 through '523 patent series, which disclose many other, non-footwear embodiments, as do the also included '117, '868, '678, and '324 patents.

In the simplest embodiment, the sipe can be created through the unique process of 3D printing by not printing a single material layer in a defined area in any location within any given structure wherein the sipe is to be positioned to provide needed flexibility. Instead of creating a void, the 3D printing process of not printing a single layer is used to create a unique sipe structure of two opposing surfaces as close together as possible to provide supporting contact while at the same time allowing the opposing surfaces to slide against each other to provide structural flexibility.

Figure 1A:
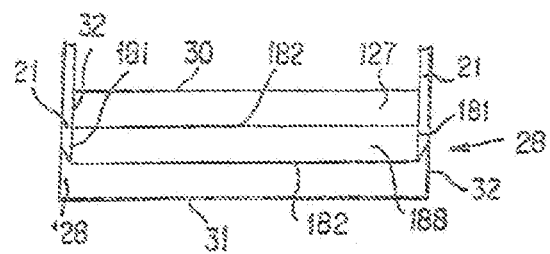
FIGS. 1A-1D are FIGS. 9A-D of U.S. Pat. No. 7,647,710 (hereinafter "the '710 patent)
Figure 1B:
Figure 1C:
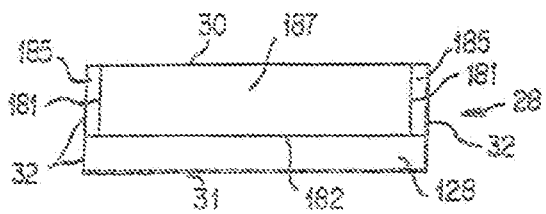
Figure 1D:
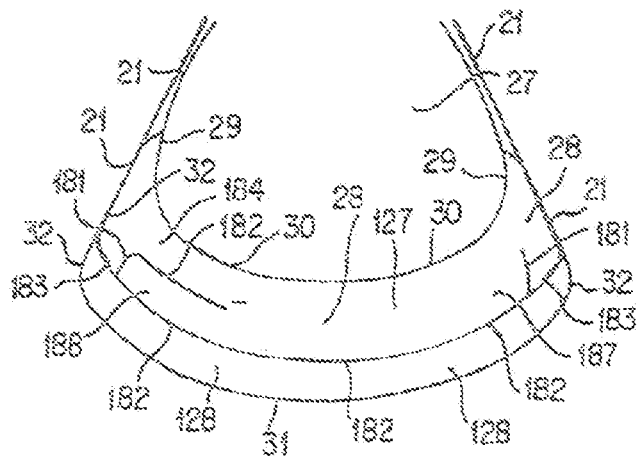
Figure 1E:
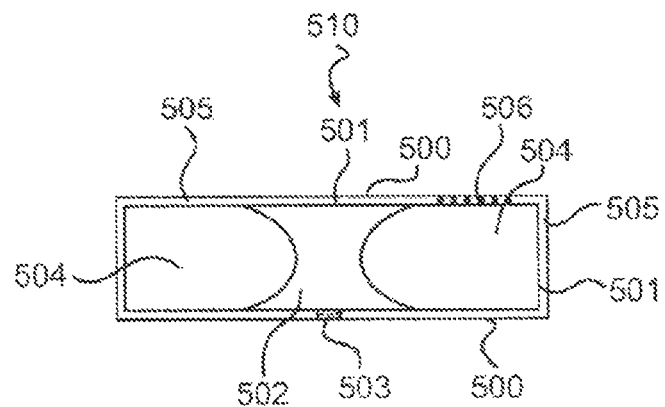
FIGS. 1E-1G are FIGS. 1A-1C of U.S. Pat. No. 9,339,074 (hereinafter "the '074 patent").
Figure 1F:
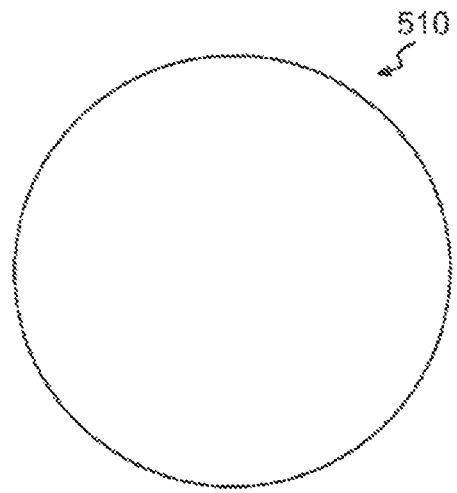
Figure 1G:
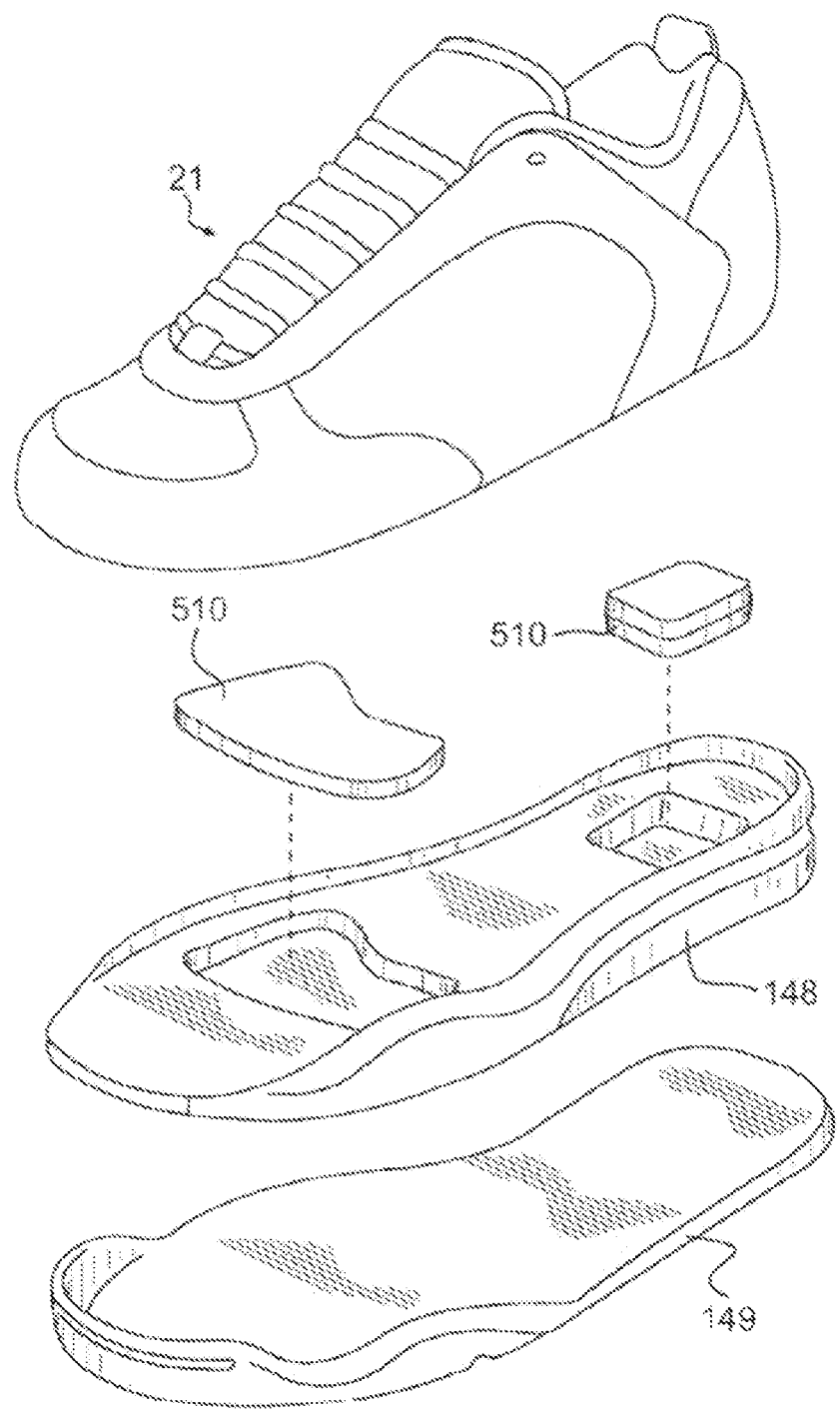
Figure 2A:
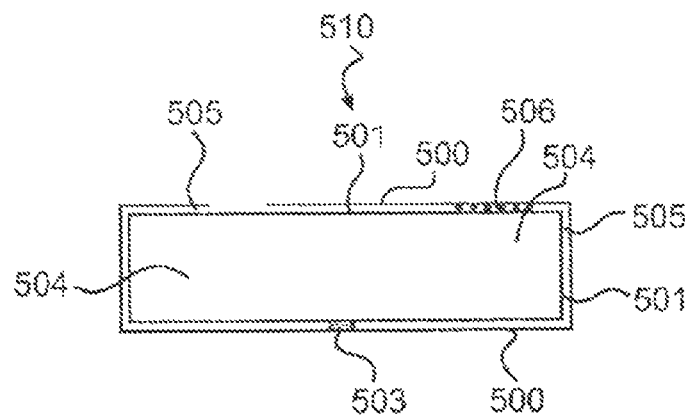
FIGS. 2A & 2B are FIGS. 2A & 2B of the '074 patent.
Figure 2B:
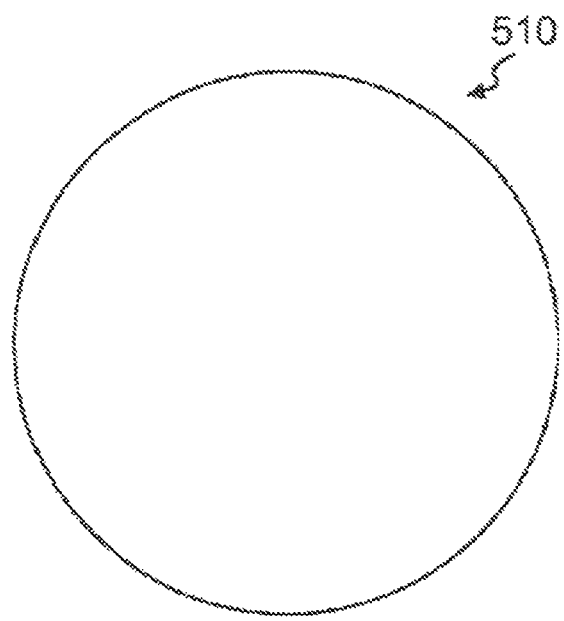
Figure 3:
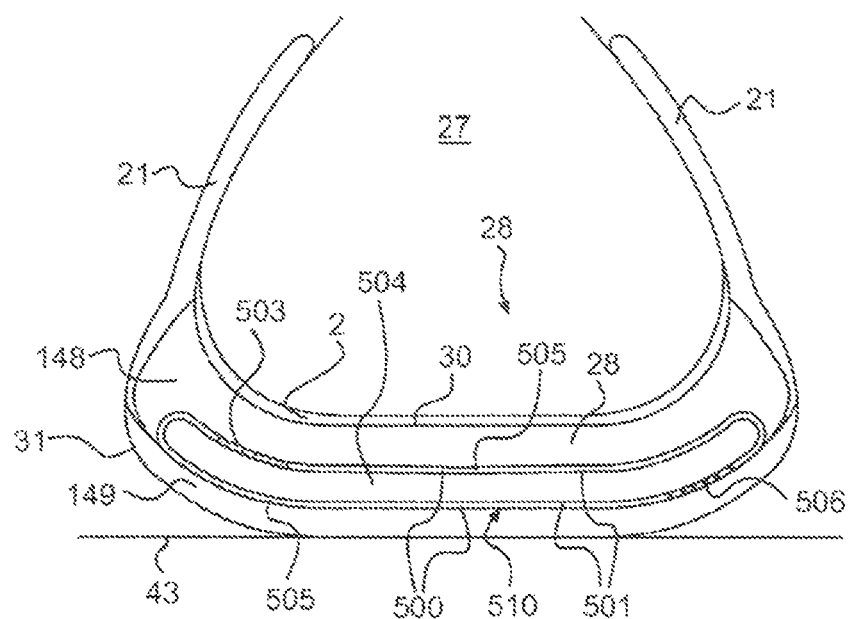
FIG. 3 is FIG. 7 of the '074 patent.
Figure 4:
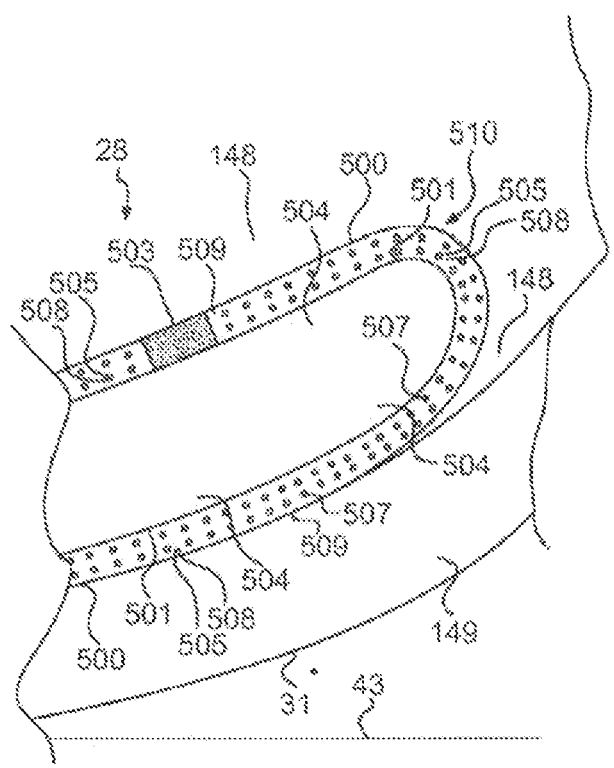
FIG. 4 is FIG. 17B of the '074 patent.
Figure 5A:
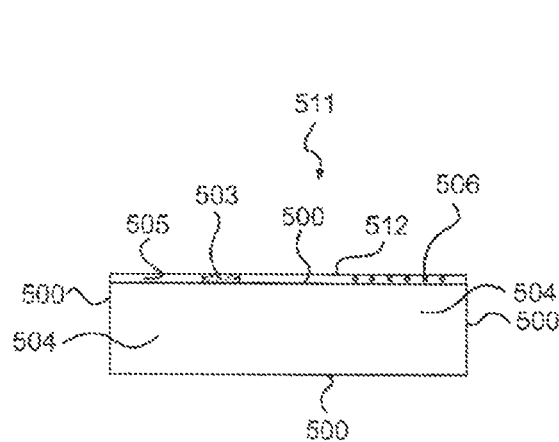
FIGS. 5A-5D are FIGS. 18A-18B & 19A-19B of the '074 patent.
Figure 5B:
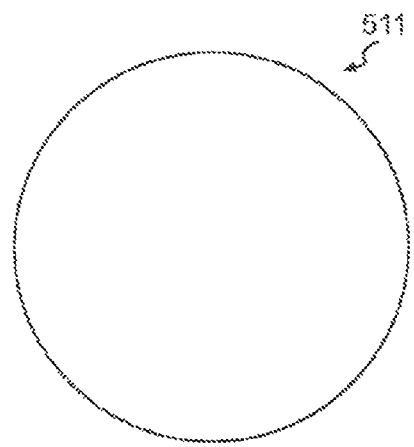
Figure 5C:
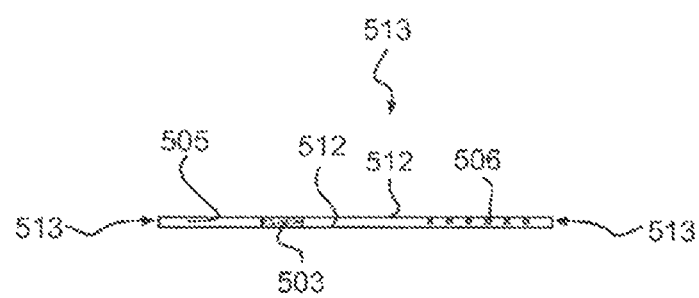
Figure 5D:
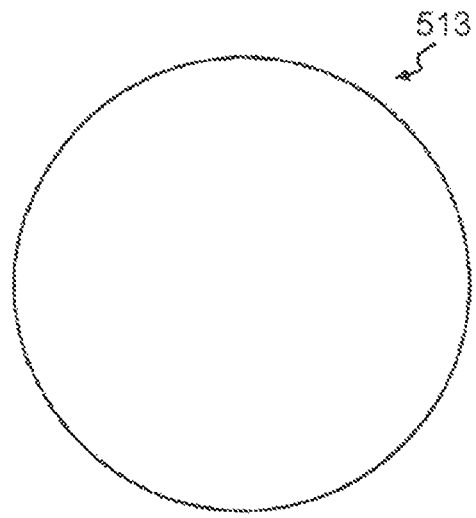
Figure 6:
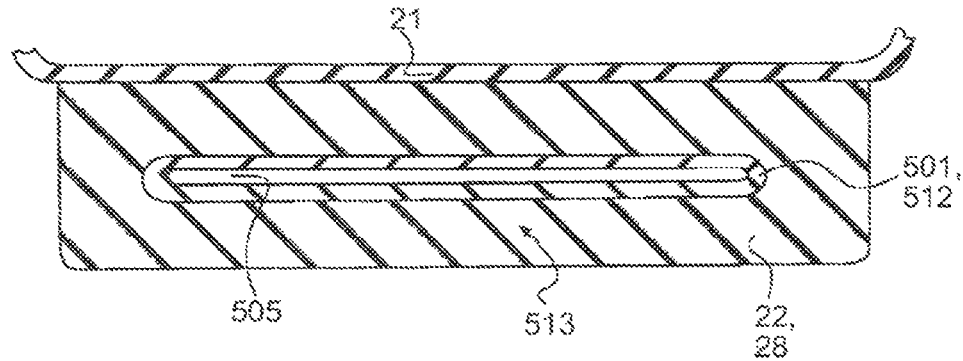
FIG. 6 is FIG. 20C of the '074 patent.
Figure 7A:
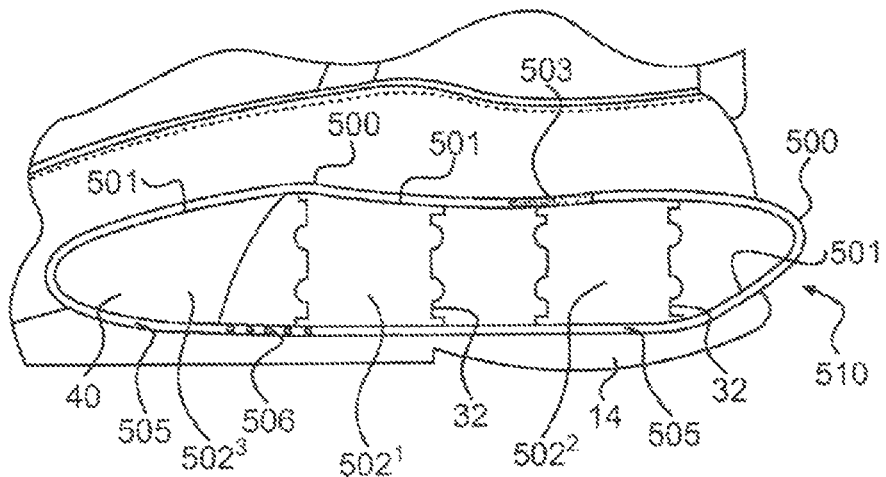
FIGS. 7A-7B are FIGS. 25A-25B of the '074 patent.
Figure 7B:
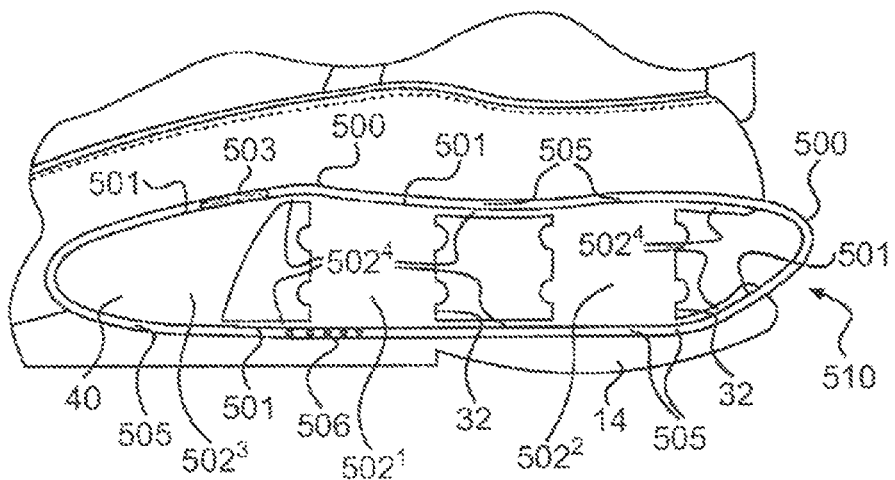
Figure 8A:
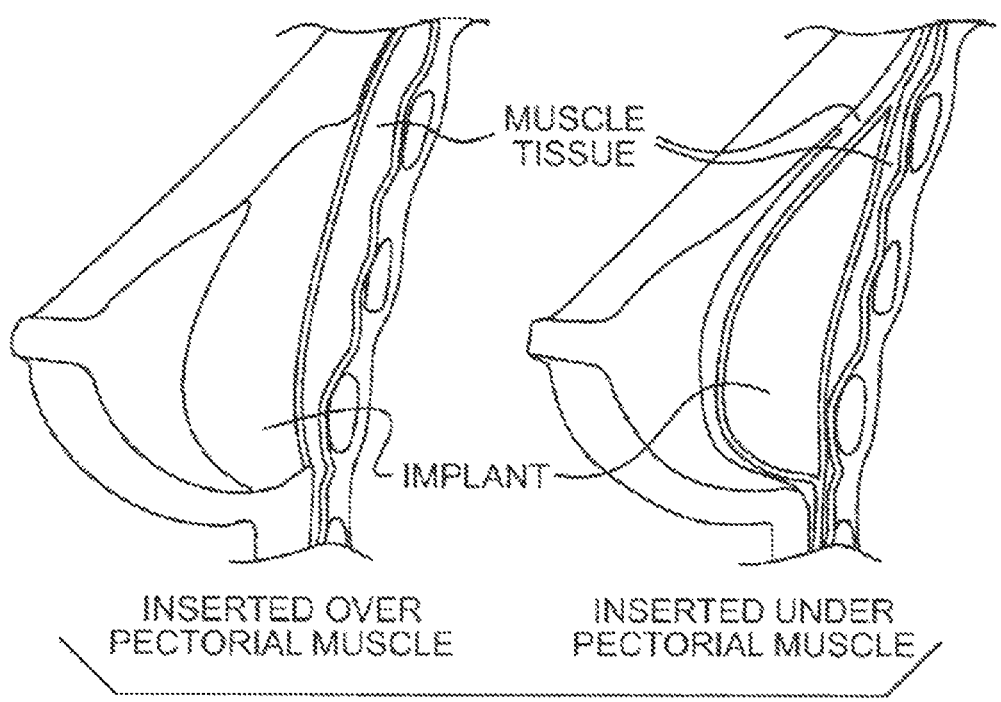
FIGS. 8A-8B are FIGS. 29A-29B of the '074 patent.
Figure 8B:
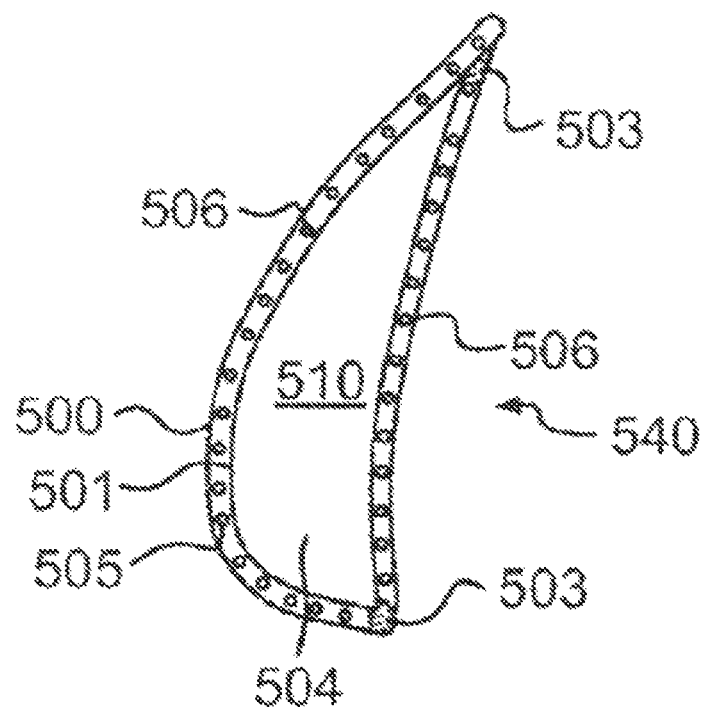
Figure 9A:
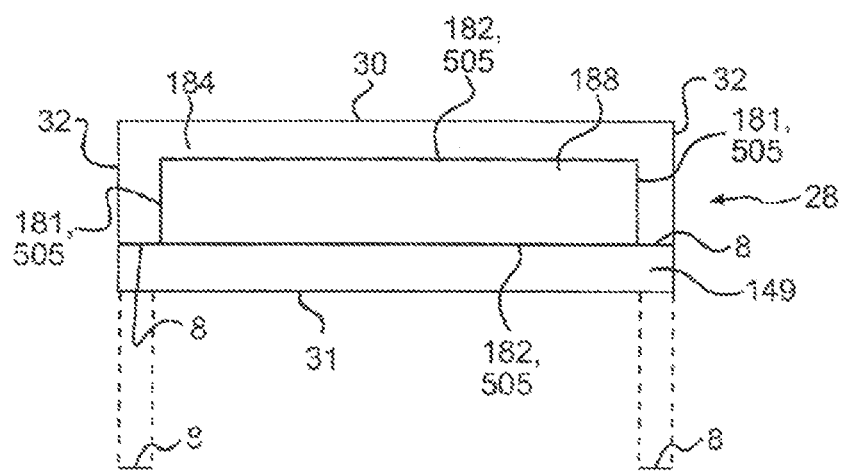
FIGS. 9A-9D are FIGS. 81A-81D of the '074 patent.
Figure 9B:
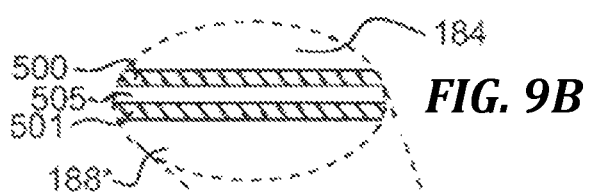
Figure 9C:
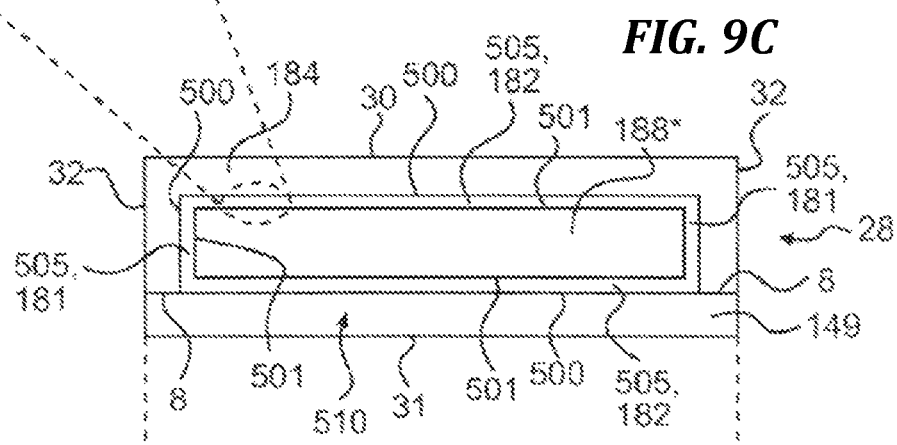
Figure 9D:
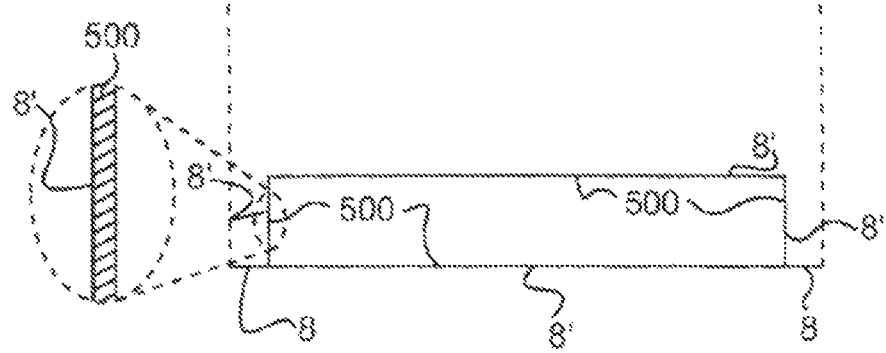

The flexibility provided by the use of sipes in footwear soles is critical in allowing a footwear sole with curved sides that parallel the structure of the barefoot sole, like FIGS. 1D and 3, to deform to flatten like the barefoot sole does under a bodyweight load, particularly during the foot's full range of ground-contacting motion, from maximum supination to maximum pronation.

In some embodiments, forming the sipe by not printing two material layers or three material layers or four material layers or more material layers may be useful, due to material characteristics or other factors.

Alternatively, the sipe can be created wherein a single 3D-printed material layer in a defined area in any location within any given structure can be printed in a different material (rather than a different color of the same material), such as lubricant or other media, to function like media 506 disclosed in the '276 through '475 patent series and '335 through '523 patent series, for example. In some embodiments, forming the sipe by printing a different material in two material layers or three material layers or four material layers or more material layers may be useful.

The 3D printing process can also be useful in creating the embodiments disclosed in the applicant's computer controlled compartments and bladders for footwear and orthotics U.S. Pat. No. 7,010,869 through U.S. Pat. No. 8,667,709 series, as well as applicant's footwear soles based on barefoot soles U.S. Pat. No. 5,317,819 through U.S. Pat. No. 7,647,710 series, also including the sole design disclosed in U.S. Pat. D731,766 issued Jun. 16, 2015, as well as U.S. design patent applications 29/610,715, 29/628,599, 29/628, 784, 29/636,128, 29/636,134, 29/636,138, 29/660,097, 29/660,104, 29/660,516, 29/660,525, 29/660,693, 29/660, 715, and 29/665,414.

The above figures show examples of sipes and associated structures that can be made in a more efficient and cost-effective way with 3D printing than existing alternatives, particularly overcoming the existing manufacturing and construction complexities discussed in the textual specification of FIGS. 81A-81D of the '276 patent. The above figures are illustrative examples that are drawn from the multitude of other figures with sipes in the U.S. patents and applications that are incorporated by reference in this application for which 3D printing would be useful in overcoming existing difficulty and inefficiency in the art.

Any of the features or components disclosed in this application can be combined with one or more of any of the features or components disclosed in any one or more of the above listed applicant's issued patents incorporated by reference in this application.

Certain reference numerals used in the figures are defined as follows:

Ref. No 500: An outer compartment, such as an outer compartment 161 or chamber 188 or bladder, at least partially or mostly or entirely enclosing a space within the outer compartment/chamber/bladder 500, which can be located anywhere in a footwear sole or upper or both or other article described in this application. Construction and materials can be, as one embodiment example, simpler in shape but otherwise similar to those used in any commercial samples of Nike Air™.

Ref No 501: An inner compartment, such as an inner compartment 161 or chamber 188 or bladder, is located inside the enclosed space of the outer compartment/chamber/bladder 500. Construction and materials of the inner compartment/chamber/bladder 501 can be, as one embodiment example, like those used in any commercial samples of gas bladders in Nike Air™.

Ref No. 502: Structural element that is optional anywhere within either outer compartment/chamber/bladder 500 or inner compartment/chamber/bladder 501, of which a 501 embodiment is shown; any flexible, resilient material can be used, including structures molded into the shape of (and using the material of) the compartment/chamber/bladder 500 or 501, as is very common in the art, such as many commercial samples of gas bladders used in Nike Air™, as well as foamed plastic or plastic composite or other materials, like Nike Shox™ or Impax™ or Reebok DMX™ or New Balance N-Ergy™. In addition, other materials can be used directly within a 501/500 compartment or can connected to or through a 501/500 compartment, as in the cushioning components of the shoe sole heel of commercial samples of Adidas 1™, including electromechanical, electronic, and other components. Some devices may benefit from the use of rigid or semi-rigid materials for part or all of a media within a compartment.

Ref No. 503: Attachment of two compartment/chambers/bladders 500/501, including particularly attachment of outer 500 to inner 501; any practical number of attachments of any form using any materials can be used, including glue.

Ref. No. 504: Media contained within all or part of compartment/chamber/bladder 500 or 501, particularly 501, can be any useful material, such as gas (including, as an example, gas used in Nike Air™ or ambient air, liquid or fluid, gel, or foam (such as a plastic like PU or EVA or equivalent or rubber (natural or synthetic) or combination of two or more; encapsulation of foam is optional); material particles or coatings, such as dry coatings like polytetrafluoroethylene can also be used. An optional element in an outer compartment/chamber 500 (or an inner compartment/chamber 501 that itself contains an inner compartment/chamber, as in FIG. 87).

Ref No. 505: Internal sipe or slit or channel or groove for flexibility, such as between inner and outer compartment/chamber 500/501 (or bladder) surfaces, as one embodiment example; such surfaces can be substantially parallel and directly contact in one useful embodiment example, but are not attached so that at least parts of the two surfaces can move relative to each other, such as to facilitate a sliding motion between surfaces; the surfaces can be in other useful forms that allow portions of the surfaces to be proximate to each other but not contacting in an unloaded condition or in a partially loaded condition or in a maximally loaded condition. Internal sipes are located internal to the device or structure in which they are present and do not extend through an outer surface of the device or structure. As such, internal sipes are completely enclosed by the material of the device or structure.

Ref No. 506: Media of internal sipe 505; media 506 can be any useful material like those used in media 504; media 506 can be located in part or all of 505 to decrease (or increase) sliding resistance between 500/501 or 505 surfaces, for example, to lubricate the surfaces with any suitable material; silicone or polytetrafluoroethylene can be used, for example; an optional element.

Ref No. 507: Metal particles.

Ref No. 508: Shock absorbing fluid containing 507; a magnetorheological fluid.

Ref. No. 509: Electromagnetic field-creating circuit.

Ref. No. 510: A flexible insert or component including siped compartments 161 or chambers 188 or bladders used for example as outer and inner compartments/chambers/bladders 500/501 for footwear soles or orthotics or uppers or other uses; a useful embodiment being two or more compartment or chambers (or bladders) 161/188 (or mix) that are separated at least in part by an internal sipe 505, including the example of at least one 501 (either 161/188 or bladder) inside at least one 500 (either 161/188 or bladder) and being separated by an internal sipe 505.

Ref No. 512: A wall of flexible insert or component 511 or 513 that is not formed by a compartment 161 or chamber 188 or bladder and that is separated from another wall by an internal sipe 505.

The invention claimed is:

1. A method of making a sole for footwear or a portion of a sole for footwear by a three-dimensional (3D) printing process, the method comprising a step of excluding, during the 3D printing process, printing one or more print particles in defined areas of plural layers of the sole for footwear or the portion of the sole for footwear in order to form at least one internal sipe in said sole for footwear or the portion of the sole for footwear, the at least one internal sipe being defined by two opposing surfaces that are configured to contact one another and slide against each other when said sole for footwear or the portion of the sole for footwear is in a loaded condition, as viewed in a single plane cross-section.

2. The method according to claim 1, wherein the sole for footwear or the portion of the sole for footwear has a section with a structure having inner and outer surfaces that are curved, as viewed in frontal plane cross-sections when the sole for footwear or the portion of the sole for footwear is in an unloaded condition.

3. The method according to claim 2, wherein the sole for footwear or the portion of the sole for footwear has a curved section with a structure having a uniform thickness as measured in frontal plane cross-sections when the sole for footwear or the portion of the sole for footwear is in an unloaded condition.

4. The method according to claim 1, wherein the sole for footwear or the portion of the sole for footwear in which the at least one internal sipe is formed comprises configurable structures that can be controlled by or through a smartphone or other mobile digital computer.

5. The method according to claim 1, wherein the method forms at least two internal sipes in the sole for footwear or the portion of the sole for footwear.

6. The method according to claim 1, wherein the method forms at least four internal sipes in the sole for footwear or the portion of the sole for footwear.

7. The method according to claim 1, wherein the method forms at least six internal sipes in the sole for footwear or the portion of the sole for footwear.

8. The method according to claim 1, wherein the sole for footwear or the portion of the sole for footwear comprises configurable structures that can be controlled by or through a smartphone or other mobile digital computer.

9. The method according to claim 3, wherein the at least one internal sipe is created by the exclusion during the 3D printing process of a portion of at least one or two or three or four or more layers of a material of the sole for footwear or the portion of the sole for footwear.

10. The method according to claim 1, wherein the at least one internal sipe is located in a midsole of the sole for footwear or the portion of the sole for footwear.

11. The method according to claim 1, wherein the method does not require separate structures associated with or proximate to the internal sipes.

12. A method of making a sole for footwear or a portion of a sole for footwear by a three-dimensional (3D) printing process, the method comprising a step of excluding, during the 3D printing process, of a portion of at least one or two or three or four or more layers of a material in defined areas of the sole for footwear or the portion of the sole for footwear in order to form at least one internal sipe in the sole for footwear or the portion of the sole for footwear, the at least one internal sipe being defined by two opposing surfaces that are configured to contact one another and slide against each other when the sole for footwear or the portion of the sole for footwear is in a loaded condition, as viewed in a single plane cross-section.

13. The method according to claim 12, wherein the method forms at least six internal sipes in the sole for footwear or the portion of the sole for footwear.

14. The method according to claim 12, wherein the sole for footwear or the portion of the sole for footwear has a section with a structure having inner and outer surfaces that are curved, as viewed in frontal plane cross-sections when the sole for footwear or the portion of the sole for footwear is in an unloaded condition.

15. The method according to claim 14, wherein the sole for footwear or the portion of the sole for footwear has a curved section with a structure having a uniform thickness as measured in frontal plane cross-sections when the sole for footwear or the portion of the sole for footwear is in an unloaded condition.

16. The method according to claim 12, wherein the method forms at least two internal sipes in the sole for footwear or the portion of the sole for footwear.

17. The method according to claim 12, wherein the method forms at least four internal sipes in the sole for footwear or the portion of the sole for footwear.

* * * * *